United States Patent
Xiao et al.

(10) Patent No.: US 12,278,807 B2
(45) Date of Patent: Apr. 15, 2025

(54) PROXY SSH PUBLIC KEY AUTHENTICATION IN CLOUD ENVIRONMENT

(71) Applicant: Fortinet, Inc., Sunnyvale, CA (US)

(72) Inventors: Han Xiao, Coquitlam (CA); Wenping Luo, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 444 days.

(21) Appl. No.: 17/491,432

(22) Filed: Sep. 30, 2021

(65) Prior Publication Data

US 2023/0101920 A1    Mar. 30, 2023

(51) Int. Cl.
*H04L 9/40* (2022.01)

(52) U.S. Cl.
CPC ........ *H04L 63/062* (2013.01); *H04L 63/0435* (2013.01); *H04L 63/0823* (2013.01); *H04L 63/0876* (2013.01)

(58) Field of Classification Search
CPC ............... H04L 63/062; H04L 63/0435; H04L 63/0823; H04L 63/0876; H04L 63/0281; H04L 63/166; H04L 63/0884
See application file for complete search history.

(56) References Cited

U.S. PATENT DOCUMENTS

| | | | | |
|---|---|---|---|---|
| 8,271,777 B2* | 9/2012 | Borisov | ................ | H04L 67/142 713/153 |
| 8,512,254 B2* | 8/2013 | Donofrio | ............. | A61B 5/6846 607/6 |
| 8,856,910 B1* | 10/2014 | Rostami-Hesarsorkh | ................... | H04L 63/1408 713/168 |
| 8,868,913 B1* | 10/2014 | Watsen | ................ | H04L 9/3265 709/227 |
| 9,363,080 B2* | 6/2016 | Bartok | ...................... | H04L 9/14 |
| 9,923,888 B2* | 3/2018 | Goel | ....................... | H04L 67/02 |
| 10,003,458 B2* | 6/2018 | Ylonen | ..................... | H04L 9/08 |
| 10,097,523 B2* | 10/2018 | Kuker | .................. | H04L 63/0478 |
| 10,110,595 B2* | 10/2018 | Choyi | ................... | H04L 9/3247 |
| 10,812,462 B2* | 10/2020 | Xu | ........................ | H04L 67/143 |
| 11,102,025 B2* | 8/2021 | Ansari | ................ | H04L 65/1108 |
| 11,368,306 B2* | 6/2022 | Kasso | .................. | H04L 9/3213 |
| 11,444,925 B1* | 9/2022 | Patimer | ................ | H04L 67/147 |
| 2009/0300721 A1* | 12/2009 | Schneider | ............. | H04L 63/029 726/3 |
| 2013/0124852 A1* | 5/2013 | Kain | ..................... | H04L 69/162 713/152 |
| 2013/0191631 A1* | 7/2013 | Ylonen | ................. | H04L 63/164 713/153 |
| 2013/0275754 A1* | 10/2013 | Kuang | ................... | H04L 63/06 713/168 |
| 2015/0150114 A1* | 5/2015 | Kuker | ................. | H04L 12/4641 726/14 |

(Continued)

*Primary Examiner* — Matthew Smithers
(74) *Attorney, Agent, or Firm* — Law Office of Dorian Cartwright; Dorian Cartwright

(57) ABSTRACT

A SSH (secure shell) public key is received from a client device 120 120 on the enterprise network, and an EMS device 140 is queried based on the SSH public key. Responsive to confirmation of registration from the EMS server, an authentication certificate based on a user and the client device 120 120 is generated. An SSH session is initiated on behalf of the client device 120 120 including submitting the certificate and the SSH public key from the client device 120 120 to the external server.

4 Claims, 4 Drawing Sheets

(56) References Cited

U.S. PATENT DOCUMENTS

| | | | |
|---|---|---|---|
| 2016/0241558 A1* | 8/2016 | Adam | H04L 63/0823 |
| 2018/0041484 A1* | 2/2018 | Gifford | H04L 9/0825 |
| 2018/0152426 A1* | 5/2018 | Rossi | H04L 63/0281 |
| 2018/0270066 A1* | 9/2018 | Doyon | H04N 21/25816 |
| 2018/0288009 A1* | 10/2018 | Yang | H04L 63/0428 |
| 2019/0007382 A1* | 1/2019 | Nirwal | G06F 9/54 |
| 2020/0334371 A1* | 10/2020 | Stoler | G06F 21/31 |
| 2021/0409385 A1* | 12/2021 | Wang | H04L 9/3247 |
| 2022/0255902 A1* | 8/2022 | Woodson | H04L 63/0263 |
| 2022/0292221 A1* | 9/2022 | Sohail | H04L 63/0428 |

* cited by examiner

PROXY SSH PUBLIC KEY AUTHENTICATION IN CLOUD ENVIRONMENT

FIELD OF THE INVENTION

The invention relates generally to computer networking, and more specifically, to providing proxy SSH sessions on a data communication network to cloud servers on an enterprise network.

BACKGROUND

SSH (secure shell) is a network communication protocol that enables two computers to communicate and share data. SSH is commonly used for remote secure login and file transfer for deployments using public-key authentication allowing passwordless login and better security.

However, the SSH public-key management could be complex within large organization where lots of users and servers involved. In a simple setup, each end-user need upload their SSH public-key to each server they need to access. Same efforts require if an end-user decided to renew SSH key, or remove from login.

Therefore, what is needed is a robust technique for providing proxy SSH sessions on a data communication network to cloud servers on an enterprise network.

SUMMARY

These shortcomings are addressed by the present disclosure of methods, computer program products, and systems for intelligent selection of transmission type for IEEE 802.11ax Wi-Fi compliant networks based on station characteristics.

In one embodiment, an SSH public key is received from a client device on the enterprise network, and an endpoint management server (EMS) device is queried based on the SSH public key. Responsive to confirmation of registration from the EMS server, an authentication certificate based on a user and the client device is generated.

In another embodiment, an SSH session is initiated on behalf of the client device including submitting the certificate and the SSH public key from the client device to the external server.

Advantageously, computer network performance is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for intelligent selection of transmission type for IEEE 802.11ax Wi-Fi compliant networks based on station characteristics.

One of ordinary skill in the art will recognize many additional variations made possible by the succinct description of techniques below.

I. Systems for Proxy SSH Sessions (FIGS. 1-2)

Figure 1:
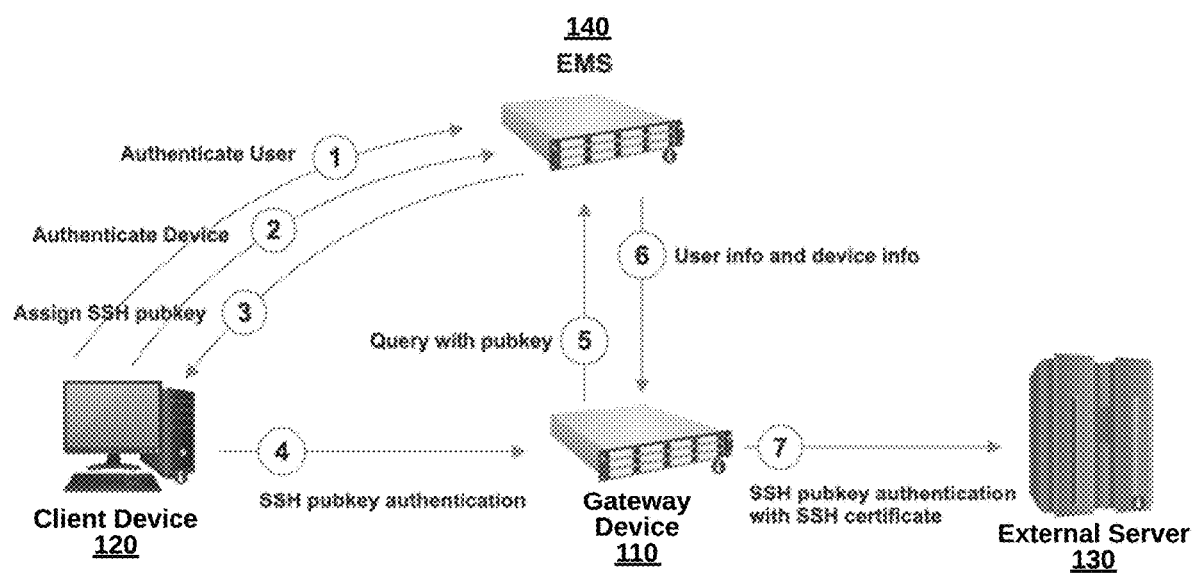
FIG. 1 is a high-level block diagram illustrating a system for providing proxy SSH sessions on a data communication network to cloud servers on an enterprise network, according to an embodiment.
Figure 2:
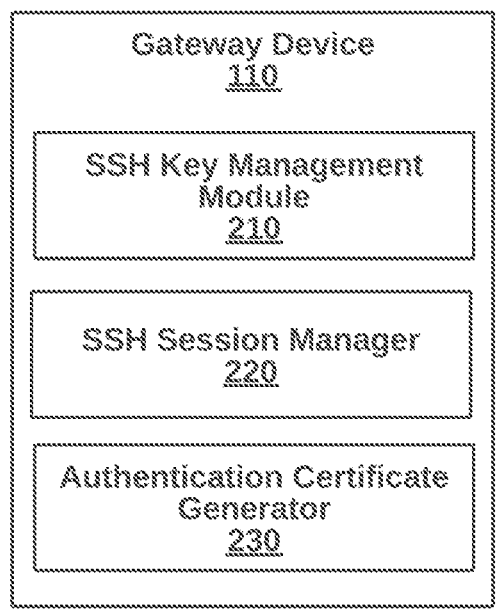
FIG. 2 is a more detailed block diagram illustrating a gateway device of the system of FIG. 1, according to one preferred embodiment.

FIG. 1 is a high-level illustration of a system 100 for providing proxy SSH (secure shell) sessions on a data communication network to cloud servers on an enterprise network, according to an embodiment. A gateway device 110 is coupled to a client device 120, an external server 130 and an EMS 140.

The components of the system 100 are coupled in communication over the data communication network 199. Preferably, the gateway device 110 connected to the data communication system via hard wire. Other components, such as the headless IoT devices can be connected indirectly via wireless connection. The data communication network 199 can be any data communication network such as a WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the EMS device 140 authenticates users and generates SSH key-pairs. Each key-pair associates with a) authenticated user, if user authentication only; or b) authenticated user/device, if device is enabled. The key-pair is downloaded from the EMS device 140 to the client. The EMS device 140 only holds the public key, pubkey, in an embodiment. At a later point in time, when the SSH key is being used for an external server, a query is received from the gateway device 120 of the SSH pubkey. In return, the EMS device 140 sends user info and/or device info to the gateway device.

With a matching policy, the gateway device 110 initiates an SSH connection with the external server and proxies SSH pubkey on behalf of the client device 120 and others. When the SSH pubkey is presented to the gateway device 120 by the client device 120, the EMS is queried to gather further information about the user and/or device associated with the SSH pubkey. This information is then utilized to generate an SSH pubkey authentication with SSH certificate for presentation to the external server on behalf of the station device, as a trusted device. Because the gateway device 120 is a MITM (man in the middle) for an SSH session, UTM features such as AV/DLP, SSH channel control, and terminal command log/block could be applied based on policy The client device 120 in one embodiment, downloads and installs a client software that automatically integrates the client device 120 for proxy SSH services the system 100. User and device authentication information can be uploaded to the EMS device 140. A secure location on the client device 120 stores the key-pair downloaded from the EMS device 140. One example unlocks with a fingerprint from a user or other biometrics.

The external server can be any remote service, such as banking, stocks, document storage, or the like. The remote proxy techniques herein speed log-in, in many cases providing passwordless log-in.

The access point 110 can be a sever blade in an array of server blades, a PC (personal computer), a mobile computing device, a laptop device, a smartphone, a tablet device, a phablet device, a video game console, a stationary computing device, an Internet appliance, a virtual computing device, a distributed computing device, a cloud-based computing device, or any appropriate processor-driven device.

FIG. 2 is a more detailed block diagram illustrating the gateway device 110 of the system of FIG. 1, according to one preferred embodiment. The gateway device 110 comprises a SSH key management module 210, an SSH session manager 220, and authentication certificate generator 230.

II. Methods for Proxy SSH Sessions (FIG. 3)

Figure 3:
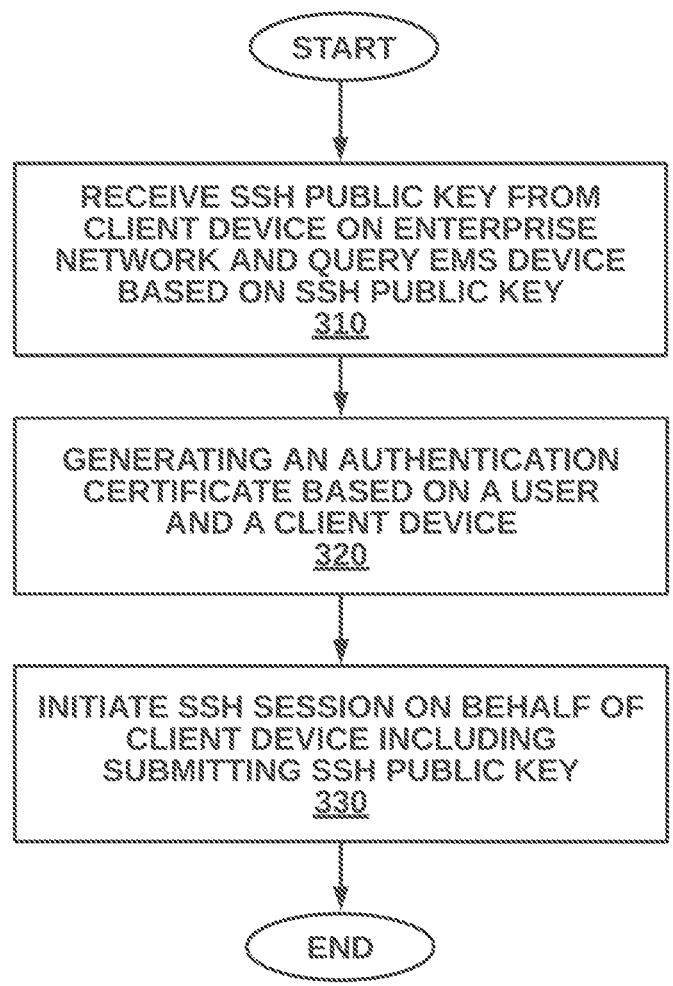
FIG. 3 is a high-level flow diagram illustrating a method for providing proxy SSH sessions on a data communication network to cloud servers on an enterprise network, according to some embodiments.
Figure 4:
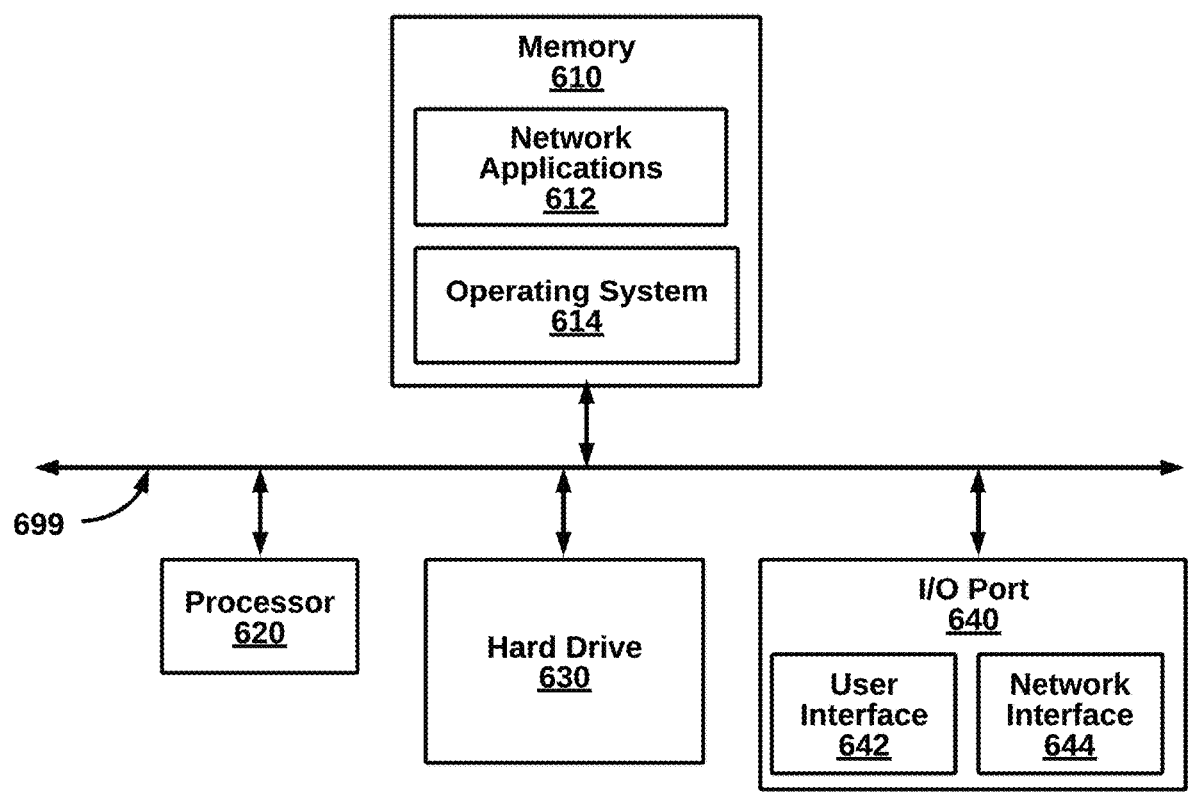
FIG. 4 is a general computing environment for implementing the system of FIG. 1, according to an embodiment.

FIG. 3 is a high-level flow diagram illustrating a method for providing proxy SSH (secure shell) sessions on a data communication network to cloud servers on an enterprise network, according to one embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, a user and device register to obtain a key-pair. At step 320, responsive to an SSH requirement of an external server, transmitting an SSH public key. Responsive to an SSH requirement of a second external server, at step 330 the SSH public key is automatically submitted by a gateway device 110 on behalf of the client device 120.

In FIG. 5, more detail about the step of transmitting the SSH public key 420 is set forth. At step 510, a gateway device 110 intercepts the SSH public key submitted by the client device 120 to the external server. At step 520, the gateway checks the SSH public key with the EMS server with verification and returns user and device information associated with the SSH public key. In turn, at step 530, the gateway generates an SSH certificate a trusted device and submits along with the SSH pub-key in order to proxy for the client device 120 120. In some embodiments, a second external server can be set up by the gateway without checking again with the EMS device 140.

III. Generic Computing Environment

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., an access point, a firewall device, a gateway, a router, or a wireless station), or a disconnected device (e.g., the access point 110 or the stations 120A-120C).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 230 stores code and data for applications.

The I/O port 640 further comprises a user interface 242 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A gateway device, on an enterprise network, for providing proxy SSH (secure shell) sessions on a data communication network to an external server, the gateway device comprising:
    a processor;
    a network interface communicatively coupled to the data communication network and to the enterprise network; and
    a memory, communicatively coupled to the processor and storing:
        a public-key detection module to receive an SSH public key from a client device on the enterprise network, and query an EMS (endpoint management server) device based on the SSH public key, wherein the EMS device has authenticated the client device and a user of the client device;
        a certification module to, responsive to confirmation of registration from the EMS device, generate a certificate based on the client device and the user of the client device; and
        an SSH session manager to initiate a proxy SSH session with the external server on behalf of the client device and the user of the client device as a man in the middle, including submitting the certificate and the SSH public key from the client device to the external server, wherein the SSH session manager automatically authenticates the client device to a second external server without knowledge of the client device that owns the SSH public key.

2. The gateway device of claim 1, wherein the EMS device provides key services for a plurality of client devices on the enterprise network.

3. A method in a gateway device for providing proxy SSH (secure shell) sessions on a data communication network to cloud servers on an enterprise network, the method comprising the steps of:
    receiving an SSH public key from a client device on the enterprise network, and query an (endpoint management server) EMS device based on the SSH public key, wherein the EMS device has authenticated the client device and a user of the client device;
    responsive to confirmation of registration from the EMS server, generating a certificate based on the client device and the user of the client device; and
    initiating a proxy SSH session with the external server on behalf of the client device and the user of the client device as a man in the middle, including submitting the certificate and the SSH public key from the client device to the external server, and automatically authenticating the client device to a second external server without knowledge of the client device that owns the SSH public key.

4. A non-transitory computer-readable media in a gateway device, implemented at least partially in hardware for, when executed by a processor, for providing proxy SSH (secure shell) sessions on a data communication network to cloud servers on an enterprise network, the method comprising the steps of:
    receiving an SSH public key from a client device on the enterprise network, and query an (endpoint management server) EMS device based on the SSH public key;
    responsive to confirmation of registration from the EMS server, generating a certificate based on the client device and the user of the client device; and
    initiating a proxy SSH session with the external server on behalf of the client device and the user of the client device as a man in the middle, including submitting the certificate and the SSH public key from the client device to the external server, and automatically authenticating the client device to a second external server without knowledge of the client device that owns the SSH public key.

* * * * *